April 13, 1954  H. PULS  2,674,958
TUBE FILLING MACHINE
Filed Dec. 2, 1948  2 Sheets-Sheet 1
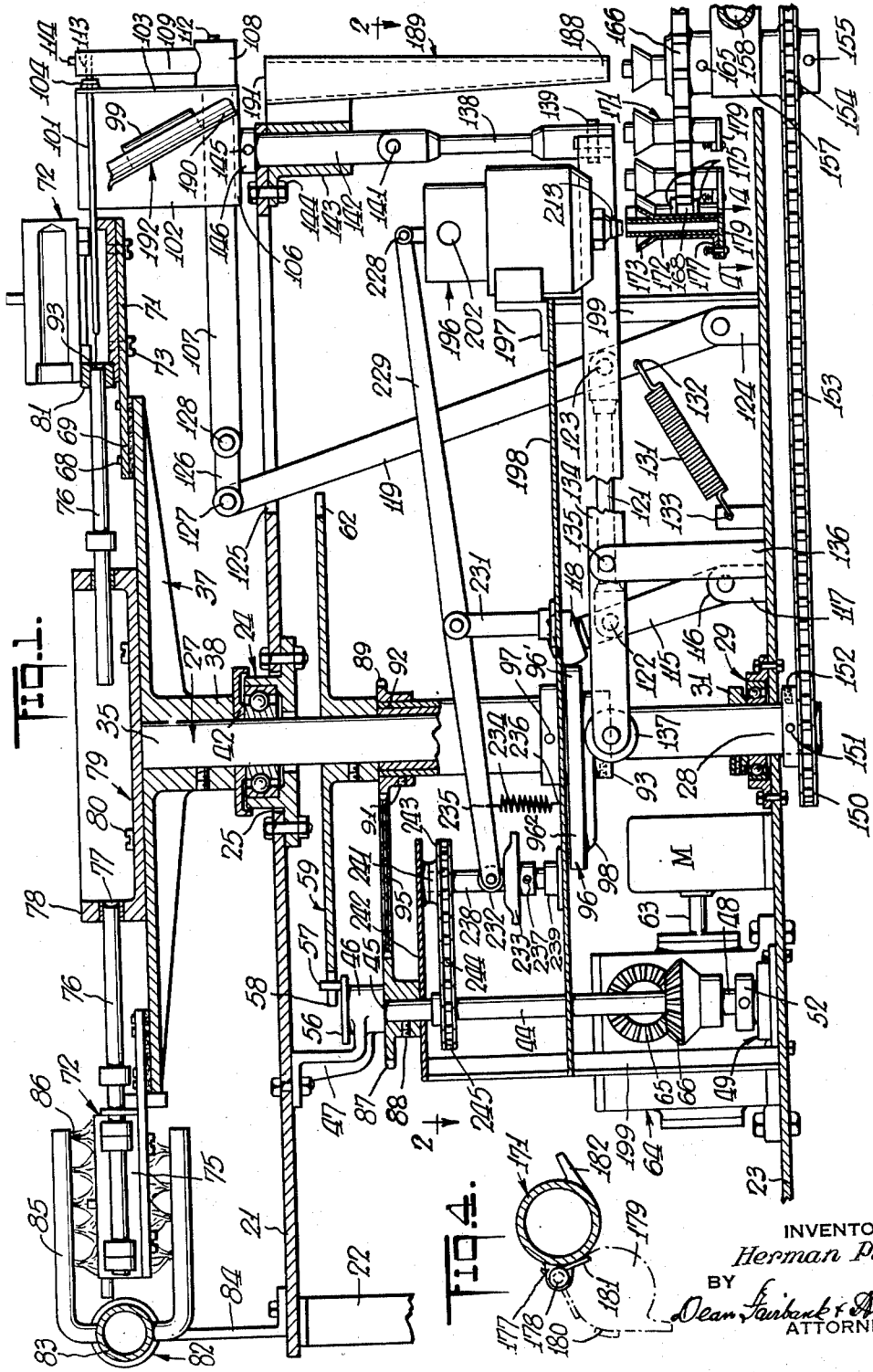
INVENTOR
Herman Puls
BY
Dean Fairbank & Hirsch
ATTORNEYS April 13, 1954　　　H. PULS　　　2,674,958
TUBE FILLING MACHINE
Filed Dec. 2, 1948　　　2 Sheets-Sheet 2
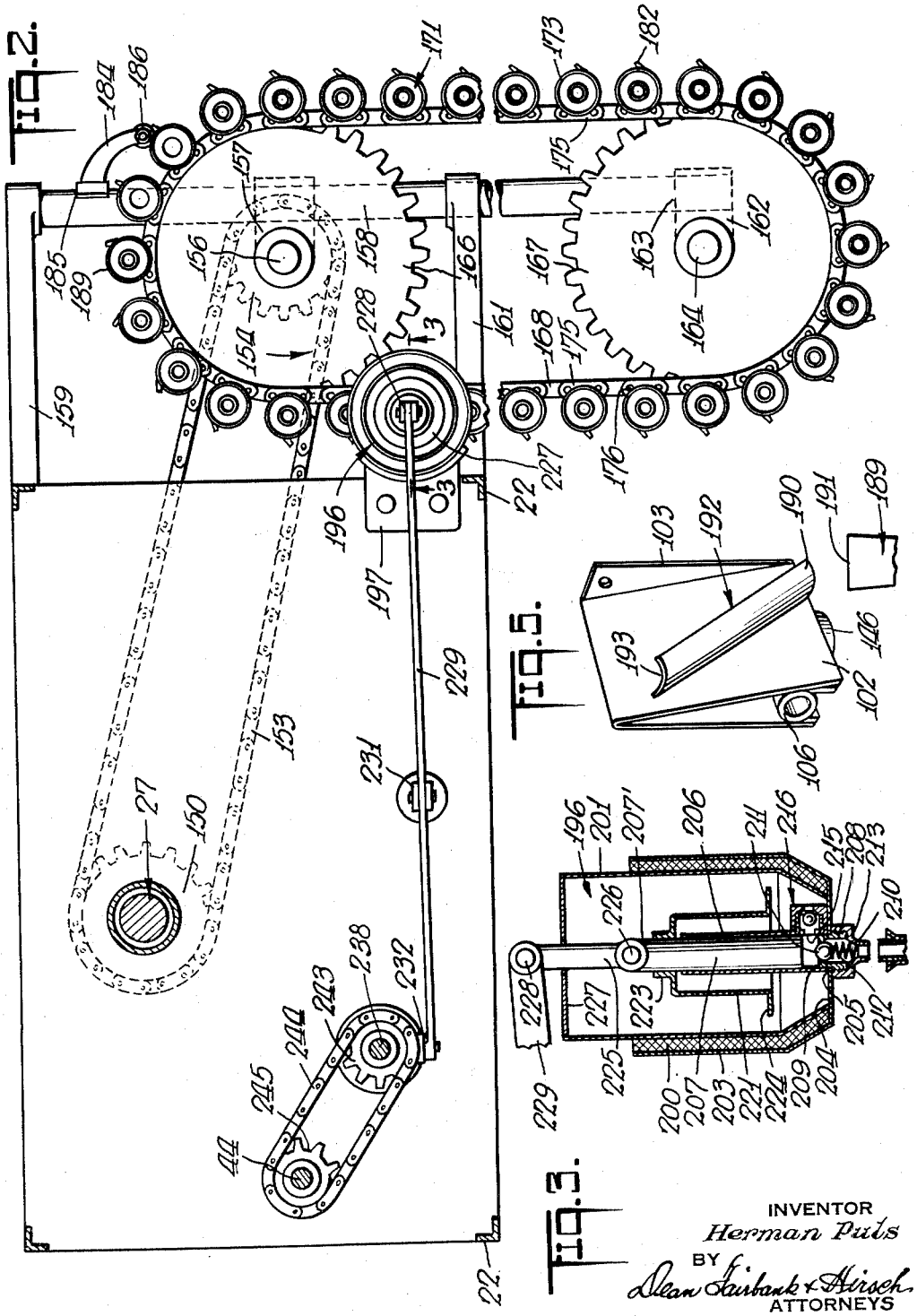
INVENTOR
Herman Puls
BY
Dean Fairbank & Hirsch
ATTORNEYS Patented Apr. 13, 1954

2,674,958

UNITED STATES PATENT OFFICE 2,674,958

TUBE FILLING MACHINE

Herman Puls, New York, N. Y.

Application December 2, 1948, Serial No. 63,072

2 Claims. (Cl. 107—1)

The present invention relates to automatic machinery for the filling of tubes of pastry with predetermined amounts of material.

Unless the pastry or other open ended tubes can be filled at a relatively high rate of speed in a sanitary manner and with a minimum of handling, the cost of manufacture of the finished product may be too high to admit of sale at popular prices and unless the filling is uniform and the filling operation is performed without breaking or cracking strain upon the fragile tube and without spreading filling on the exterior of the tube with resultant disfiguration thereof, the product is likely to be unsalable.

It is accordingly among the objects of the invention to provide an automatic filling machine for expeditiously charging tubes of pastry or the like with a predetermined amount of material without manual handling, without contamination and without crushing, cracking, breaking or spattering of such tubes and for release from the machine of the finished product without injury thereto, or adhesion of filler to the machine.

Another object is to provide a machine for automatically forming, baking and filling such tubes and discharging such filled tubes without cracking or breaking thereof, which machine is compact and rugged in construction, which functions with a minimum number of operating parts, none of which is delicate or apt to become out of order, which machine is capable of continuous operation at a relatively high speed for long periods without attention, and the working parts of which are readily accessible for maintenance and repair and the cost of upkeep of which is low.

While the invention in its broader aspects embodies the filling of pre-fabricated open ended tubes of pastry or the like, a specific embodiment is concerned with a machine for automatically forming, baking and filling such tubes, and while the forming and baking may be performed in other manners, it is preferred to utilize as that element of the more elaborate machine of such specific embodiment, the baking machine shown and described in my co-pending application now Patent No. 2,563,866 of August 14, 1951.

According to one aspect of the invention, a plurality of upright pastry tube carriers are provided mounted on a conveyer therefor. Each of the carriers is a self-contained unit having a movable floor on which the lower open end of a pastry tube may rest and a plurality of operating stations are provided to feed a baked pastry tube into successive carriers and to fill the baked tubes with a predetermined charge of material. Means are provided to effect relative step by step movement between said carriers and said operating stations, the latter only functioning when there is no relative movement between the operating stations and the carriers. Desirably the filling station is so constructed and arranged that its discharge nozzle is slightly spaced from and may be vertically aligned with the open upper ends of successive pastry tubes in the upright carriers as the latter are advanced. In addition means are provided, coacting with the movable floors of the carriers in sequence successively to release said filled pastry tubes during the course of the relative step by step movement between the operating stations and the carriers.

According to another aspect of the invention, a plurality of operating stations are provided automatically to form and bake pastry tubes, to feed such baked pastry tubes successively into a plurality of upright carriers, to charge each of such baked pastry tubes with a predetermined amount of material and to discharge such filled tubes from said carriers.

In a specific embodiment of the machine herein chosen to illustrate my invention, the carriers are identical each comprising a vertical tube affixed to a horizontal endless conveyor chain and having a pivoted, horizontally movable closure plate at the bottom thereof. Through a transmission from a main drive, the conveyor is advanced in a step by step movement so that each carrier thereon will successively pause at a sequence of operating stations, each of which is actuated by a continuously rotating cam driven through a transmission from the main drive and means are provided at one of said operating stations to inject, in sequence, a predetermined charge of material into each of said baked pastry tubes and at another of said operating stations to pivot said closure plates away from the bottom of said carriers, also in sequence for release of said filled pastry tubes therefrom.

In the accompanying drawings in which are shown one or more of various possible embodiments of the several features of the invention, Fig. 1 is a longitudinal cross section of the apparatus incorporated in a pastry tube baking machine, Fig. 2 is a transverse sectional view taken along line 2—2 of Fig. 1, Fig. 3 is a vertical sectional view of the pump taken along line 3—3 of Fig. 2, Fig. 4 is a transverse sectional view of a carrier taken along line 4—4 of Fig. 1 and, Fig. 5 is a perspective view of the discharge plate.

While the various cams, gears and sprocket wheels for operating the constituent elements of the machine may be arranged in timed relation in any of a multiplicity of possible ways, to be driven by a common motor M desirably on the base of the machine, a particularly desirable arrangement is shown in the drawings.

General construction

Referring now to the drawings, the machine comprises a bed 21 supported by a conventional frame 22, which frame also supports a base 23 affixed thereto beneath bed 21. Journalled in a ball bearing 24 which extends through an opening 25 in bed 21, is a vertical shaft 27, the lower end 28 of which extends beneath base 23 and is journalled in a ball bearing 29 affixed to base 23. In order to prevent shaft 27 from sliding through bearing 29, a collar 31 is provided, affixed to the lower end 28 of the shaft 27. A circular table 37 having a hub 38 is positioned on the upper end 35 of shaft 27 and securely affixed thereto.

An intermittent drive mechanism is provided to effect step by step rotation of table 37. This mechanism comprises a vertical drive shaft 44 journalled at its upper end 45 in a ball bearing 46 under and affixed to the bed 21 of the machine by a bracket arm 47 and at its lower end 48 in a ball bearing 49 affixed to base 23. To restrain drive shaft 44 from axially downward movement in its bearings 46 and 49, a collar 52 is provided, securely affixed to the lower end 48 of the drive shaft 44.

Affixed to the upper end 45 of drive shaft 44 which protrudes beyond bearing 46, is a disc 56 which forms part of a Geneva drive mechanism. Disc 56 has an upstanding pin 57 near the periphery thereof which coacts with the notched rim 58 of a drive plate 59 affixed to shaft 27. Illustratively, there are twenty-four notches 62 in rim 58 so that twenty-four complete rotations of disc 56 would be required for one complete rotation in intermittent 15 degree steps of shaft 27 to which plate 59 is affixed.

To rotate the drive shaft 44, a motor M is provided preferably mounted upon base 23 of the machine. The motor is connected by a shaft 63 to a reduction gear box 64 which, as it is itself conventional and forms per se no part of this invention, will not be described in detail. The reduction gears in gear box 64 rotate a bevel gear 65 which coacts with a corresponding bevel gear 66 affixed to drive shaft 44 to rotate the latter.

Affixed to table 37 near the periphery thereof by screws 68 and equally spaced thereon, are a plurality of support arms 69, illustratively twenty-four in number, extending radially of and protruding as at 71 beyond the periphery of table 37. Each of the protruding ends 71 of radiating arms 69 has a mold 72 affixed thereto by screws 73, which molds and the operation thereof have been described in detail in my co-pending application above identified and hence will not be further described.

In order to form a tube from the dough with which the mold is charged, a horizontal plunger rod or core 76 is provided for each of the molds. Each of the plunger rods is slidably mounted at one end in the corresponding one of a plurality of bearing openings 77 in upstanding rim 78 of circular hub 79 which rises from and is affixed to the center of table 37 by screws 80. The other end of each of the plunger rods is slidably mounted in a bearing bushing 81 of its associated mold 72.

To heat the molds 72, an oven 82 is provided, which in the embodiment herein, preferably comprises an arcuate gas pipe 83 affixed to the bed of the machine by brackets 84 and extending about the arc defined by the outer ends of the molds. The arcuate length of pipe 83 is such that at the required operating speed of the machine to give the maximum feasible output, it will give the correct period of heating without overbaking or underbaking the pastry tubes.

Extending radially inward from pipe 83 are a plurality of pairs of gas outlets 85, each pair forming a yoke. The pairs of outlets 85 are positioned along pipe 83 so as to be spaced from each other by a distance equal to that between the outer ends of consecutive molds. Thus after each intermittent movement of table 37 by the intermittent drive mechanism therefor, one of said pairs of outlets will be vertically aligned with an associated mold to straddle the same. The outlets each have a plurality of openings 86 therein, positioned so that the gas flame therefrom will play upon the top and bottom of the mold for equal distribution of heat thereto.

It is of course to be understood that other types of ovens could be used such as electric ovens, it being important only that the heat be distributed equally over the mold to provide even baking of the contents thereof.

In order that the baking of the tubes of pastry be automatically performed, a plurality of operating stations are provided about the table 37. The operations performed at these stations include the charging of the mold, the introduction of the plunger rod or mold core to form the pastry tube and after baking in the oven, the removal of the mold core and the subsequent removal of the baked tube from the mold.

The operations at the various stations are performed in timed relation from a cam shaft driven from motor M. This cam shaft may be in the form of a sleeve 92 encompassing shaft 27, and retained against sliding movement along said shaft 27 by resting upon a collar 93 affixed to said shaft. The cam shaft is driven through a transmission, comprising a sprocket wheel 87 affixed by a set screw 88 to drive shaft 44 beneath bearing 46. An identical sprocket wheel 89 is affixed by a set screw 91, to cam shaft 92. By means of a sprocket chain 95 encircling sprocket wheels 87 and 89, cam shaft 92 will be rotated one revolution for each revolution of drive shaft 44.

A cam 96 is affixed to cam shaft 92 by set screw 97 and has an additional cam 98 on the under face thereof, cams 96 and 98 actuating the pastry tube removal mechanism.

During the operation of the baking machine thus described, the molds are successively opened, filled with a predetermined amount of dough, closed and locked, a plunger rod or core introduced into the charged mold to form a tube therein, the plunger rod locked in the mold, and after baking in the oven, the plunger rod or core is unlocked and removed therefrom, the mold is unlocked, and the mold is opened. As such operations have been described in detail in my co-pending application above identified and per se form no part of this invention they will not be further described.

In order to remove the baked pastry tube 99 from the mold after plunger rod 76 has been removed therefrom and the mold has been opened, a horizontally and vertically reciprocable pick up pin 101 is provided, as shown in Fig. 1. To carry the pin, a discharge plate 102 is provided preferably tilted as shown in Fig. 5. The plate on one edge thereof has a flange 103 with an outwardly extending bushing bearing 104 affixed thereto near the top thereof, through which bearing said pin extends. The lower end of the plate has a bushing bearing 106 extending transversely thereacross in which is positioned a rod 107 having a hub 108 rigidly affixed thereto at one end thereof. Hub 108 has a vertical rod 109 affixed in an opening therein by a set screw 112, the upper end of said rod 109 having an opening 113 therethrough in which is inserted one end of pin 101, securely retained therein by set screw 114.

To reciprocate horizontal pin 101, a transmission is provided actuated by cam 96. This transmission comprises a substantially upright lever 115 pivoted at its lower end 116 to a bracket 117 affixed to base 23 and having a roller 118 at its upper end in engagement with cam 96. Lever 115 is connected to a substantially upright lever 119 by means of a pitman 121 pivoted at its ends as at 122 and 123 to the respective levers. Lever 119 is pivoted at its lower end to a bracket 124 affixed to base 23 and its upper end protrudes through a slot 125 in bed 21 and is pivotally connected to rod 107 by means of a pitman 126 pivoted at its ends as at 127 and 128 to lever 119 and rod 107, the pivotal connection of pitman 126 thus permitting the horizontal pin 101 to be moved vertically and horizontally.

By means of a coil spring 131 affixed at one end to lever 119 as at 132 and anchored to base 23 as at 133, roller 118 is maintained in constant engagement with cam 96 so that lever 119 follows the latter.

To move horizontal pin 101 vertically, a transmission is provided actuated by cam 98 beneath cam 96. This transmission comprises a substantially horizontal lever 134 pivoted near its midsection as at 135 on a bracket 136 affixed to base 23. One end of lever 134 adjacent cam 98 has a roller 137 thereon in engagement with the face of cam 98. The free end of lever 134 has a pitman 138 pivotally connected thereto as at 139, the upper end of the pitman being pivotally connected as at 141 to a vertical plunger rod 142 slidably mounted in a bushing 143 affixed beneath bed 21 by bolts 144. The upper end of rod 142 is securely affixed by set screw 145 to hub 146 affixed to bushing 106 on plate 102 as by welding or the like.

The construction thus far described is not per se claimed herein as it is the subject of my co-pending application above identified.

Pastry tube filling mechanism

According to the present invention from its broader aspects the filling machine comprises a horizontal conveyor having a plurality of self-contained carrier units mounted in uniformly spaced relation thereon, each to carry a baked pastry tube. Each of said carrier units desirably has a movable floor and means are provided to displace said floors in sequence after said pastry tubes have been filled to release such tubes from said carriers. In one specific embodiment of the present invention the conveyor desirably comprises an endless belt illustratively a sprocket chain 168 girdling a pair of spaced sprocket wheels 166 and 167, affixed by set screws 165 to the upper ends of vertical stud shafts 156 and 164 respectively. Shaft 156 is rotatably mounted in and extends above a bearing 157 rigid with a transverse support rod 158 mounted on laterally extending arms 159 and 161 rigid with one end of frame 22. Transverse rod 158 which extends beyond arm 161 at right angles thereto has a bearing 162 rigid therewith at the end 163 thereof which rotatably mounts vertical stud shaft 164 extending above said bearing.

Although any convenient mechanism could be used for advancing sprocket chain 168, as illustratively shown herein, the intermittent drive mechanism shown and described in my co-pending application above identified is desirably utilized. To this end a horizontal sprocket wheel 150 is affixed by set screw 151 on the lower end 28 of shaft 27 extending beneath bed 23 and connected by means of a sprocket chain 153 to a horizontal sprocket wheel 154 affixed by set screw 155 to the lower end of vertical stud shaft 156.

Preferably the carrier units 171, a plurality of which are provided, each comprises an upright cylindrical tube 172 open at both ends and having a flared mouth 173, the tube being of diameter slightly greater than that of the pastry tube to be inserted therein. The carriers 171 are each affixed to the sprocket chain 168 so as to be advanced thereby by means of a pair of vertically aligned, spaced, parallel webs 175 rigid with the wall of the tube 172 and extending laterally therefrom, each pair of fingers straddling the sprocket chain 168 and being affixed thereto preferably by the pins 176 which assemble the links of the sprocket chain.

The wall of the tube 172 at the lower end thereof has a laterally extending lip 177 (Fig. 4) rigid therewith, on which is pivotally mounted as at 178, a horizontally movable closure plate 179, positioned beneath lip 177 and normally urged beneath the open bottom end of tube 172 to close the latter, by a torsion spring 181. One end of said spring is anchored in each plate 179 and the other end is abutted on the respective tubes 171. In order to prevent spring 181 from pivoting closure plate 179 past the bottom of tube 172 an upstanding stop 180 is provided rigid with the edge of the closure plate which will abut against the wall of the tube 172 when the closure plate is beneath the open end thereof. Closure plate 179 has a laterally extending finger 182 preferably integral therewith, which may engage a trip arm 184 affixed at one end 185 to rod 158, and having its other end 186 in the path of the fingers 182 as the sprocket chain is advanced in the manner hereinafter set forth, whereby the closure plates 179 may successively be pivoted to open the bottoms of the carriers.

The sprocket chain 168 is so positioned that the flared mouths 173 of the carriers 171 after each stepping movement of the sprocket chain, will successively be beneath and vertically aligned with the end 188 of a vertical discharge chute 189 at the pastry tube insertion station. The chute is rigidly affixed to the frame with the mouth 191 thereof substantially vertically aligned with the lower end 190 of a substantially U-shaped trough 192 affixed on the inclined face of discharge plate 102 at an angle thereto, and substantially diagonally thereacross with the concavity 193 of the trough extending upwardly as shown.

In order to fill the baked pastry tubes 99, a pastry tube charging station is provided comprising a pump 196, which although it could be of any suitable type, desirably comprises, as shown in Fig. 3, a casing 201 which contains the material with which the baked pastry tubes 99 are to be filled. The casing 201 which has a filling port 202 on the side wall thereof is affixed as at 197 to a horizontal ledge 198 mounted on the bed 23 of the machine by upright brackets 199. The casing 201 has a jacket 203 around the lower portion thereof, coaxial therewith and spaced therefrom to provide room for heating means such as an electric heating element 200 to heat the contents of the casing.

Extending upwardly from the floor 204 of the casing 201 and affixed thereto over an opening 205 therein is a sleeve 206 in which is slidably mounted a piston 207 the upper end 207' of which extends above the sleeve. Affixed to the rim of opening 205 and extending therebelow is an externally threaded nipple 208. The latter has a ball seat conformation 209 at the upper end thereof on which is seated a ball 211 normally retained on said seat by a coil spring 212 positioned in the bore of said nipple and retained therein by the tapered wall 210 of the bore of discharge nozzle or sleeve 213 threaded on said nipple. As is shown in Fig. 1 the discharge nozzle 213 is positioned over the flared mouths of the carriers 171 so that it may be vertically aligned therewith and is only slightly spaced from such mouths.

In order to permit the contents of casing 201 to enter the sleeve 206, the latter has an opening 215 in the lower end of the wall thereof about which is mounted a ball valve 216 which, as it is conventional in construction, will not be further described.

To agitate the contents of the casing so as to prevent hardening or congealing thereof, an agitator member 221 is provided which may comprise an inverted cup-shaped member affixed as at 223 to the upper end 207' of piston 207 and having a plurality of lateral, radially extending fingers 224 on the rim thereof.

To actuate the pump a pitman 225 is provided pivotally connected as at 226 at its lower end to the upper end of the piston, extending through an opening in the top cover 227 of the casing, and pivotally connected at its upper end as at 228 to one end of a lever 229 pivotally connected near its mid point to an upright bracket 231 affixed on ledge 198.

The free end of lever 229 has a cam roller 232 thereon which rides on the surface of a cam 233 and is retained thereagainst by coil spring 234 affixed at one end to lever 229 as at 235 and at its other end to ledge 198 as at 236. Cam 233 is affixed by set screw 237 to a vertical stud shaft 238 rotatably mounted at its lower and upper ends respectively in bearings 239 and 241 affixed to ledge 198 and to lateral member 242, the latter being supported by standard 199. In order to rotate stud shaft 238, the latter has affixed thereto beneath bearing 241 a sprocket wheel 243 which is operatively connected by sprocket chain 244 to a sprocket wheel 245 affixed to shaft 44.

As motor M through transmission 63, drives the gears in reduction gear box 64, the coacting bevel gears 65 and 66 will rotate drive shaft 44 together with sprocket wheel 87 and disc 56. As disc 56 rotates, the upright pin 57 thereon will engage one of the twenty-four notches 62 in drive plate 59 at each complete revolution of disc 56, thereby stepping drive plate 59 through 15 degrees or one twenty-fourth of a revolution. Thus, shaft 27 to which drive plate 59 is affixed will also move one twenty-fourth of a revolution as will table 37 to which molds 72 are affixed. It is apparent, therefore, that it will require twenty-four step by step movements of table 37 for each mold thereon to make one complete revolution through the baking cycle heretofore described.

As sprocket wheel 87 rotates, it will rotate sprocket wheel 89 by means of sprocket chain 95, thereby driving cam shaft or sleeve 92 and the cams thereon. It is to be noted that while drive plate 59 is intermittently stepped through a complete revolution, sleeve 92 will be continuously rotating.

When a mold 72 has been opened in manner described in my co-pending application above identified, and the baked pastry tube 99 therein is aligned with pin 101, at this time, the low portion 96¹ of cam 96 will have rotated so that it is now against roller 118 of lever 115. As lever 115 follows cam 96 and is moved inwardly, coil spring 131 will pivot lever 119, thereby sliding rod 107 in bushing 106 to move pin 101 inwardly through bushing 104 into the bore of the baked pastry tube 99 in the mold.

When the pin 101 has entered pastry tube 99, cam 98 will thereupon engage roller 137 on lever 134 to pivot the free end of the latter upwardly, thereby lifting rod 142 and with it plate 102 on which pin 101 is mounted, and with it baked pastry tube 99 to remove the latter from the open mold. Continued rotation of cam 96 to its original position will move its high portion 96² against roller 118 of lever 115. Through the transmission from the lever 115 to pin 101, the latter will be moved outwardly through bushing 104. As this occurs, the end of pastry tube 99 will abut against the bushing 104 and as the pin is completely withdrawn from the bore of pastry tube 99, the latter will be released to fall into trough 192 and slide down the latter into the mouth 191 of discharge chute 189. The continued rotation of cam 98 will lower the free end of lever 134, to lower plate 102 and pin 101 thereon so that it is ready for the next mold.

The discharge end 188 of the chute 189 at this time is vertically aligned with the flared mouth of one of the carriers 171 and by reason of the larger diameter of the carrier the pastry tube 99 may readily enter therein without danger of jamming, with the lower end of the pastry tube resting on the floor or closure plate of the carrier. The carriers are so spaced on sprocket chain 168 that with each step of the shaft 27 and table 37 thereon which will align a mold 72 with pin 101, a carrier 171 will be advanced by the transmission from sprocket wheel 150 on shaft 27 until it is vertically aligned with the discharge end 188 of chute 189 and hence as shaft 27 rotates, pastry tubes will be discharged into successive carriers.

When the stepped movement of sprocket chain 168 has moved a carrier 171 into vertical alignment with discharge nozzle 213 of the pump 196 the pastry tube in such carrier must be filled. To this end cam 233 on shaft 238 contacts roller 232 on lever 229 to pivot the latter and force piston 207 into sleeve 206 thereby compressing the material therein and forcing ball 211 off its seat 209 so that such material may pass through nozzle 213 into the pastry tube 99.

As nozzle 213 is directly over the bore of the pastry tube and only slightly spaced therefrom and as cam 233 is relatively small and steep, the piston 207 will be given a rapid thrust to insure injection of material into the bore of the pastry tube without chance of such material spattering on the outside of the pastry tube which in addition to disfiguring the pastry tube would harden and cause the pastry tube to stick in its carrier with resultant malfunctioning of the machine. The pressure created by this thrust will close ball valve 216 to seal opening 215 thereby ensuring that a fixed quantity of material will be ejected each time.

Once roller 232 has passed over the high portion of cam 233, spring 234 will quickly pivot lever 229 to lift piston 207 thereby creating a suction in the sleeve 206 which will seat ball 211 on its seat 209 to seal the discharge nozzle 213 and open ball valve 216 so that material in the casing 201 can enter the sleeve 206 through opening 215.

This operation is repeated with each stepping movement of the sprocket chain so that successive pastry tubes 99 may be filled.

As the sprocket chain 168 is intermittently advanced, the end 186 of fixed trip member 184 will successively engage fingers 182 on closure plates 179 to pivot said closure plates horizontally to open the bottoms of the carriers 171 thereby enabling the filled pastry tubes to slide out therefrom into a suitable receptacle (not shown). As each carrier moves past trip member 184, the finger 182 of closure plate 179 will be disengaged, and spring 181 will pivot the closure plate back so that it again closes the bottom of the carrier. If the material with which the pastry tube is filled should adhere to the closure plate, by reason of the horizontal movement thereof the bond would be sheared without danger of cracking or breaking of the bottom of the pastry tube.

If desired where material such as liquid chocolate is used to fill the pastry tubes, cooling means (not shown) may be provided along the path of movement of the carriers to hasten the hardening of such material.

The machine herein can operate for many hours without supervision, requiring as it does only an adequate supply of material. If any of the carriers should require repairs or cleaning, it is a relatively simple matter to replace them with new units thus reducing the lay-up time of the machine.

As the pastry tubes are not manually handled from the time that they are initially formed until they are discharged from the filling machine, there is no danger of contamination thereof or of cracking or breaking thereof. Hence the finished product will be sanitary and as it may be produced at a relatively high rate of speed with practically no waste, can be sold at a low price.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. In a machine for baking and filling tubes of pastry, of the type comprising a frame, a table mounted on said frame, a plurality of molds affixed to said table, a motor, means actuated by said motor for successively forming pastry tubes in said molds, and a conveyor mounted on said frame; the combination therewith of a plurality of carriers affixed to said conveyor, means to remove the contents of said molds, said removing means comprising a substantially upright plate, means affixed to said frame to lift said plate, a pin slidably mounted on said plate transversely thereacross, radially aligned with said molds and in juxtaposition with the periphery of said table, means affixed to said frame to reciprocate said pin, whereby when said pin is moved toward said mold, it will enter the pastry tube therein, and when said plate is lifted, said pin will lift such pastry tube from said mold, means when said pin is moved away from said mold to remove said pastry tube from said pin, a trough on said plate rigid therewith and extending substantially diagonally thereacross, whereby said pastry tube may be inserted into said carriers, means successively to charge said pastry tubes, and means successively to remove the charged pastry tubes from said carriers.

2. In a machine for baking and filling tubes of pastry, of the type comprising a frame, a table mounted on said frame, a plurality of molds affixed to said table, a motor, means actuated by said motor for successively forming pastry tubes in said molds, and a conveyor mounted on said frame; the combination therewith of a plurality of carriers affixed to said conveyor, means to remove the contents of said molds, said removing means comprising a substantially upright plate, means affixed to said frame to lift said plate, a pin slidably mounted on said plate transversely thereacross, radially aligned with said molds and in juxtaposition with the periphery of said table, means affixed to said frame to reciprocate said pin, whereby when said pin is moved toward said mold, it will enter the pastry tube therein, and when said plate is lifted, said pin will lift such pastry tube from said mold, means when said pin is moved away from said mold to remove said pastry tube from said pin, a trough on said plate rigid therewith and extending substantially diagonally thereacross, a substantially vertical chute rigidly fixed to said frame with the inlet end of said chute substantially vertically aligned with the lower end of said trough and the discharge end of said chute positioned over said carriers in the path of movement thereof and positioned so as to be successively aligned therewith after each intermittent advance of said conveyor adapted to insert pastry tubes into successive carriers, means successively to charge said pastry tubes, and means successively to remove the charged pastry tubes from said carriers.

References Cited in the file of this patent
UNITED STATES PATENTS

| Number | Name | Date |
|---|---|---|
| 778,295 | Williams | Dec. 7, 1904 |
| 1,197,211 | Kennedy | Sept. 5, 1916 |
| 1,289,907 | Proper | Dec. 31, 1918 |
| 1,412,727 | Walsh | Apr. 11, 1922 |
| 1,653,402 | Kaser | Dec. 20, 1927 |
| 1,716,266 | Flamm | June 4, 1929 |
| 1,719,931 | Hall | July 9, 1929 |
| 1,926,914 | Popov | Sept. 12, 1933 |
| 2,160,783 | McDonald | May 30, 1939 |
| 2,200,347 | Smith | May 14, 1940 |
| 2,207,179 | Schreiber | July 9, 1940 |
| 2,382,619 | Earp | Aug. 14, 1945 |